Oct. 20, 1953     V. L. FRANTZ     2,656,144

FLUID PRESSURE CONTROL VALVE

Filed Jan. 3, 1950

Inventor:
Virgil L. Frantz

By Ernest J. Mechlin his Attorney

Patented Oct. 20, 1953

2,656,144

UNITED STATES PATENT OFFICE 2,656,144

FLUID PRESSURE CONTROL VALVE

Virgil L. Frantz, Roanoke, Va.

Application January 3, 1950, Serial No. 136,581

9 Claims. (Cl. 251—76)

This invention relates generally to valves and more particularly to a balanced valve which is in complete balance whether the valve is open or closed.

The primary object of the invention is to provide an improved balanced valve in which the operating force is independent of the volume of fluid passing through the valve.

Another object of the invention is to provide a balanced valve adapted to be operated by a solenoid, the valve being so constructed and arranged that the fluid pressure to which it is subjected in normally closed position is balanced such that in opening the valve the only force to be overcome is that of the resilient or other means normally holding the valve in closed position.

A further object of the invention is to provide a balanced valve in which the closure is of such construction and so positioned relative to the inlet port that there may be provided on its movement to open position a substantially uniform passage between inlet and outlet ports.

A still further object of the invention is to provide a balanced valve of the type described which is adapted to be solenoid-operated.

Other objects and advantages of the invention will appear hereinafter in the detailed description, be particularly pointed out in the appended claims, and illustrated in the accompanying drawings, in which:

Figure 1:
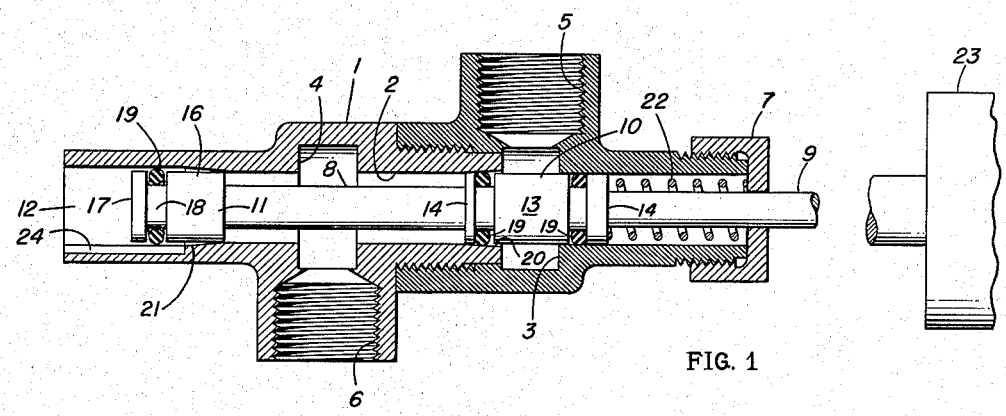
Figure 1 is a longitudinal sectional view showing the valve in closed position.

Referring now in detail to the drawings in which like reference characters designate like parts, the improved balanced valve there illustrated is comprised of a housing or casing 1 which may be formed in either one or two pieces. Extending longitudinally of the housing is a central or axial bore or passage 2 which is preferably substantially cylindrical and of uniform diameter throughout most of its length. This bore is interrupted by a pair of spaced desirably cylindrical chambers or cylinders 3 and 4, respectively, the former communicating with an inlet or intake port 5 and the latter with an outlet or exhaust port 6. As shown, these ports may be disposed substantially normal to the bore, and as their names imply, are adapted to be connected, respectively, to a source of fluid pressure and to the device to which that pressure is intended to be applied, such as a locomotive sand trap. The bore 2 may extend through the casing and in this event is preferably closed at its inner or inlet end by a centrally apertured cap or cover 7, the latter being removably attached to the housing through threading or like means.

Mounted in the bore 2 of the valve and slidable axially thereof is a closure or valve member designated generally as 8 and having a stem or shaft 9 of restricted cross-section relative to that of the bore. Formed on the stem and spaced therealong are two pistons, plungers or valve members, one a main or control piston 10 and the other a relief or balancing piston 11. Of these pistons, the main piston 10 is adapted normally to underlie and close the inlet port 5, and the relief piston to seat in a relief port 12, the latter forming part of the bore 2 outwardly of the outlet port 6.

As shown, the main piston is formed of a central body 13 having a pair of oppositely disposed heads 14, spaced from said body and providing therebetween restricted necks 15 in the form of peripheral grooves or slots of substantially rectangular cross-section. The relief piston 11 has a body 16 and but a single head 17 spaced therebeyond and separated therefrom by a restricted neck 18, also in the form of a peripheral groove or slot of substantially rectangular cross-section.

Figure 2:
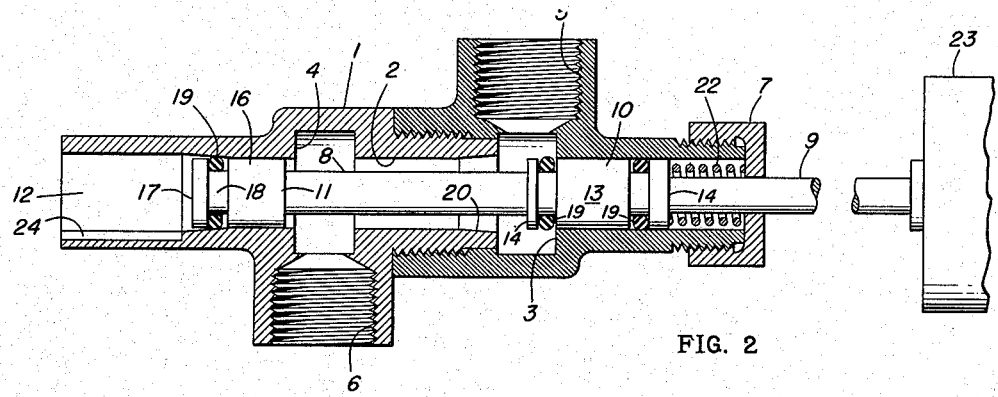
Figure 2 is a longitudinal sectional view showing the valve in open position.
Figure 3:
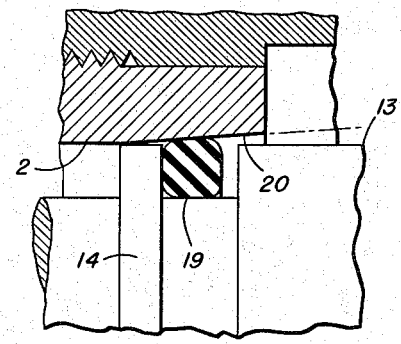
Figure 3 is a fragmental sectional view on an enlarged scale showing the details of one of the closure members and the related portion of the valve housing.

The three heads, as well as the bodies of the main and relief valves are preferably of equal diameter and of substantially the same diameter as the main portion of the bore 2, such that the entire valve member can slide therethrough. So slidable, the pistons of the valve member would alone be incapable of preventing leakage of fluid through the valve. There are therefore provided a plurality of O rings or sealing members 19, each seatable in one of the three necks of the two valves. These O rings are substantially circular in cross-section when unstressed and made of rubber or like material having inherent resiliency, as well as the capability of being compressed or flowing. Unstressed, the thickness of the rings relative to the depths of their slots is such that they will normally project above the pistons, while the relative widths of the rings and slots are such as to permit the rings to be contained therewithin when the latter are stressed or compressed. The inner of the two rings of the main valve is always contained within the cylindrical bore 2 beyond the inlet port, as shown in Figures 1 and 2, whether the valve is in open or closed position. However, the remaining two rings are designed alternately to engage and disengage the wall of the bore. For the latter purpose the bore on opposite sides of the outlet port 6 is outwardly tapered or flared to provide valve seats 20 and 21, for the main and relief valves, respectively, the taper preferably being slight but sufficient to permit entry of the corresponding O ring therewithin without subjecting the ring to shear.

As previously mentioned, the main and relief valves are adapted to close the inlet and relief ports, respectively, such closure being obtained through engagement of the outer ring of the former and the single ring of the latter with their tapered valve seats. The pistons are spaced along the stem 9 sufficiently to permit the valves to be closed alternately, the main valve thus being open when the relief valve is closed, and vice versa. For maintaining the main valve normally in closed position, resilient or other means 22 are provided which may be in the form of the illustrated coil spring. While the valve may be operated manually or otherwise, it is particularly adapted to be operated through a solenoid 23, which may be positioned in line with and connected to the stem 9 of the valve member, the stem for this purpose being extended or prolonged beyond the adjacent open end of the bore 2 and projecting through the previously mentioned apertured cap 7.

With the above construction the valve member 8 will normally have its body underlying and closing the inlet port 5, the body then extending across the cylindrical chamber 3 with its heads 14 and their associated O rings 19 positioned outwardly and on opposite sides of the chamber. At the same time the relief valve 11 will be free of its seat such that fluid can pass therebeyond, a longitudinally disposed bleed recess or passage being provided in the wall of the bore 2 for this purpose in the illustrated embodiment. In this position, the O rings and their respective heads of the main valve being of equal diameter and presenting the same area of surface to the inlet port, the forces exerted by the fluid pressure from the aforementioned pressure source axially of the valve member through these surfaces are in balance and, the relief valve then being open, there is no back pressure to disturb such balance. Consequently, the only force having an active component then acting upon the valve member is the spring 22. So also, when the valve is in open position as shown in Figure 2, the exposed opposed surfaces of the main and relief valves are equal and the fluid pressure forces exerted axially of the valve member are resultantly in balance, such that the only active axial force components are those of the return spring 22 and the solenoid 23. It is therefore obvious, the axial fluid pressure forces being in balance in both open and closed position of the valve, that operation of the valve is independent of the amount of such pressure and that the only forces that need be considered are those of the resilient means and the solenoid. Consequently, it is only necessary to provide sufficient force in the solenoid to overcome the opposed force of the spring to enable the valve to be opened and, since acting only against frictional forces, the spring also may be much weaker than the return springs normally employed in fluid pressure valves.

By virtue of its independence of the pressure and volume of the fluid whose passage it controls, the balanced valve of the present invention is ideally suited for use as an actuating valve for controlling sanding and other operations. In such applications it provides not only effective control of fluid flow, as well as a bleed for the line beyond the valve through its relief port, but enables such control to be obtained through a minimum of force by the illustrated solenoid or other means.

Several other features of the valve are worthy of mention. Of these, one is that the two taper-seat engaging rings, always being exposed to a uni-direction of flow of fluid, are held by this flow within their respective slots and prevented from accidental dislodgement therefrom. Additionally, as previously mentioned, the valve member, due to the compressability of the several O rings within their respective slots, is capable of passing through the axial bore 2 of the housing, thus enabling the rings to be applied first and the valve member thereafter to be slid or assembled as a unit within the housing.

From the above detailed description it will be apparent that there has been provided an improved balanced valve which operates independently of the fluid pressure to which it is exposed and is of wide application. It should be understood that the described and disclosed embodiment is merely exemplary of the invention and that all modifications are intended to be included which do not depart either from the spirit of the invention or the scope of the appended claims.

Having described my invention, I claim:

1. A fluid pressure control valve comprising a casing, a passage formed in said casing, inlet and outlet ports connectable through said passage, piston means seated in and movable axially of said passage, said means including a substantially symmetrical member normally closing said passage between said ports and a second member connected to and spaced from said first named member, said second member normally permitting flow of fluid therepast from one of said ports, and said members being constructed and arranged to open and close said valve independently of fluid pressure acting thereon.

2. A fluid pressure control valve comprising a casing, a passage formed in said casing, inlet and outlet ports connectable through said passage, piston means seated in and movable axially of said passage, said means including a main member having substantially symmetrical portions normally disposed on either side of the path of flow of fluid into said valve, one of said portions normally closing said passage, and a second member connected to and spaced along said passage from said main member, said second member normally permitting flow of fluid therepast from one of said ports, and said main and second members cooperating to balance fluid pressure forces acting on said means on opening and closing of said valve.

3. A fluid pressure control valve comprising a housing having a bore, spaced intake and exhaust ports communicating with said bore, a valve member mounted in said bore, a substantially symmetrical piston on said valve member normally lying in the path of flow of fluid entering said valve through said intake port and positioned to close said valve, a second piston on said valve member spaced from said first named piston and normally positioned to permit flow of fluid therepast from one of said ports, and compressible means associated with each of said pistons for alternately preventing passage of fluid therepast, said pistons and associated compressible means cooperating to neutralize the effect of fluid pressure on said valve member.

4. A fluid pressure control valve comprising a housing having a substantially cylindrical bore, spaced intake and exhaust ports communicating with said bore, said bore on either side of said exhaust port being tapered to provide spaced outwardly flaring valve seats, one of said seats being disposed intermediate said intake and exhaust ports and the other of said seats communicating with and interposed between one of said ports and a relief port, a valve member mounted in said bore and slidable therethrough, a main piston on said valve member and normally lying in said intermediate seat, a relief piston on said member spaced from said main piston and normally removed from said other seat, resilient means associated with said main and relief pistons and normally projecting therebeyond for alternately seating in and sealing said seats, and means carried by said pistons and cooperating with said seat sealing means for neutralizing the effect of fluid pressure on said valve member.

5. A fluid pressure control valve comprising a housing having a longitudinally extending bore, spaced intake, exhaust and relief ports communicating with said bore, tapered valve seats in said bore between said exhaust and said intake and relief ports, a valve member reciprocably mounted in said bore, spaced pistons on said valve member associated with said seats and alternately seatable therein, and compressible members on said pistons, certain of said compressible members engaging and sealing said associated seat, and said pistons cooperating to neutralize the effect of fluid pressure on said valve member.

6. A fluid pressure control valve comprising a housing having a longitudinally extending bore, spaced intake and exhaust ports connectable through said bore, tapered valve seats in said bore adjacent either side of said exhaust port, a valve member reciprocably mounted in said bore, a piston on said valve member normally seated in one of said seats and projecting beyond opposite sides of the path of flow of fluid from said intake port, a second piston on said valve member seatable in and normally removed from said other seat, and O rings associated with certain of said pistons and adapted to seat in and seal the associated valve seat, said rings cooperating with said pistons to neutralize the effect of fluid pressure on said valve member.

7. In a fluid pressure control valve including a housing having a central bore and spaced intake and exhaust ports communicating with said bore, the combination of a valve member mounted in said bore, a double headed piston on said valve member, said piston normally lying in the path of said intake port, and a compressible member associated with each of the heads of said piston, at least one of said compressible members normally projecting outwardly beyond said piston for closing an associated valve seat and being compressible within said piston on shifting thereof, and said compressible members normally lying on opposite sides of the path of fluid entering said valve through said intake port and neutralizing the effect of fluid pressure on said valve member.

8. In a fluid pressure control valve having a housing, a substantially cylindrical bore extending longitudinally therethrough, and an intake port communicating with said bore, the combination of a valve member reciprocably mounted in said bore, a piston carried by said valve member and adapted to pass through said bore, a valve seat interrupting said bore and tapering outwardly towards said intake port, a resilient compressible packing associated with either end of said piston and normally disposed on opposite sides of said intake port, one of said packings normally projecting outwardly of said piston and being adapted to seat in and seal said tapered seat, said packing being compressible within the confines of said piston, and said packings cooperating to neutralize the effect of fluid pressure on said valve member when said piston is in normal position.

9. A fluid pressure control valve comprising a housing having a central bore, inlet and outlet ports connectable through said bore, a valve member slidable axially of said bore, a main piston on said valve member normally lying in the path of said inlet port and closing said bore, and a relief piston carried by said valve member outwardly of said outlet port and normally permitting passage of fluid therepast from said outlet port, said main piston being displaceable away from said inlet port for opening said bore, means on said main piston for balancing the fluid pressure forces applied thereto in normal position and means on said relief piston and cooperating with certain of said means on said main piston for balancing said forces when said valve member is in open position.

VIRGIL L. FRANTZ.

References Cited in the file of this patent

UNITED STATES PATENTS

| Number | Name | Date |
|---|---|---|
| 331,789 | Harvey | Dec. 8, 1885 |
| 394,475 | Dwyer | Dec. 11, 1888 |
| 1,211,040 | Baird | Jan. 2, 1917 |
| 1,530,691 | Parsons | Mar. 24, 1925 |
| 1,765,090 | Morin | June 17, 1930 |
| 2,342,763 | Smith | Feb. 29, 1944 |
| 2,485,504 | Morgan | Oct. 18, 1949 |